June 13, 1939.　　　　J. SHOBEL ET AL　　　　2,162,567
SAFETY LOCK FOR AUTOMOBILE DOORS AND THE LIKE
Filed Nov. 8, 1937　　　2 Sheets-Sheet 1
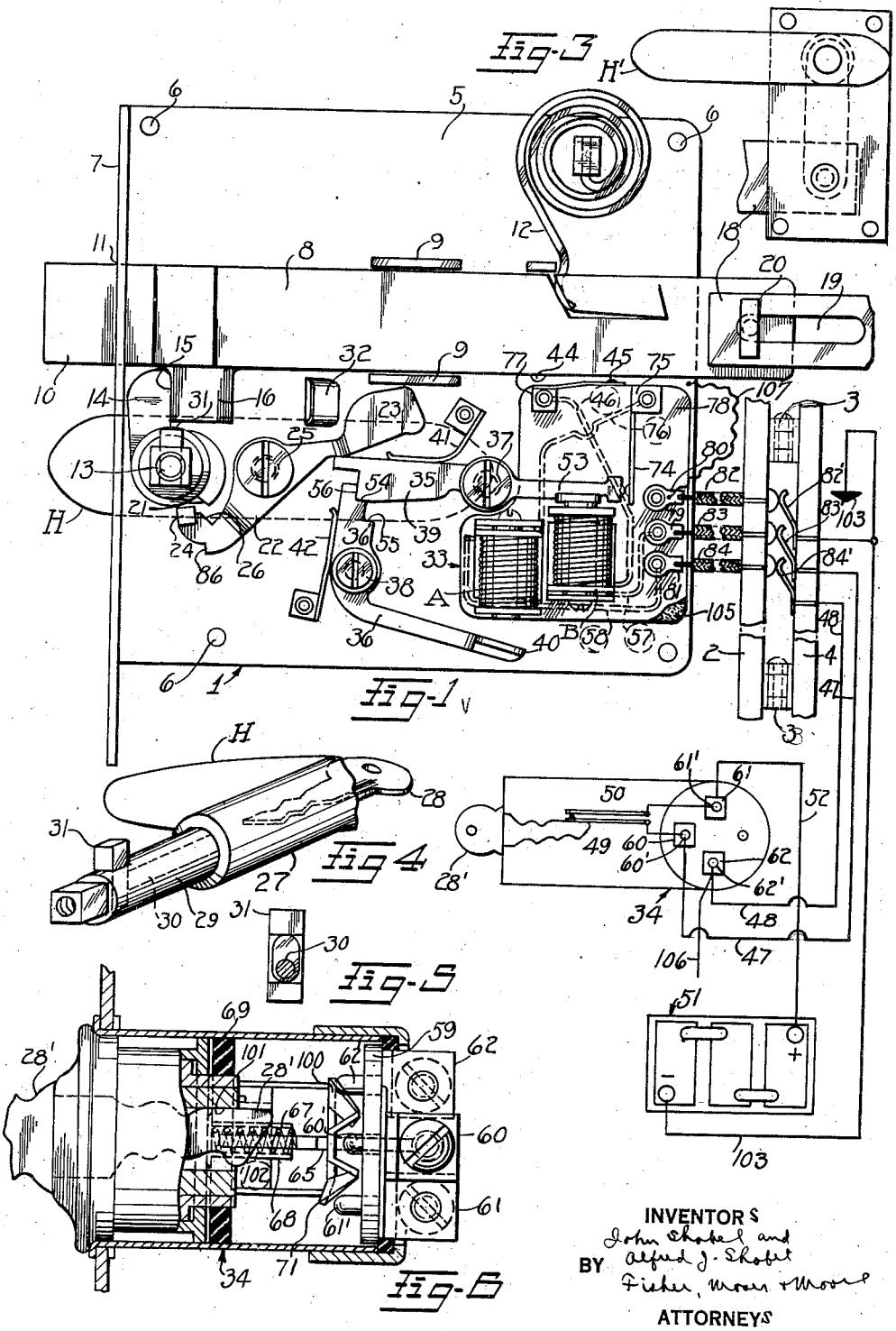
INVENTORS
John Shobel and
BY Alfred J. Shobel
Fisher, Moore & Moore
ATTORNEYS

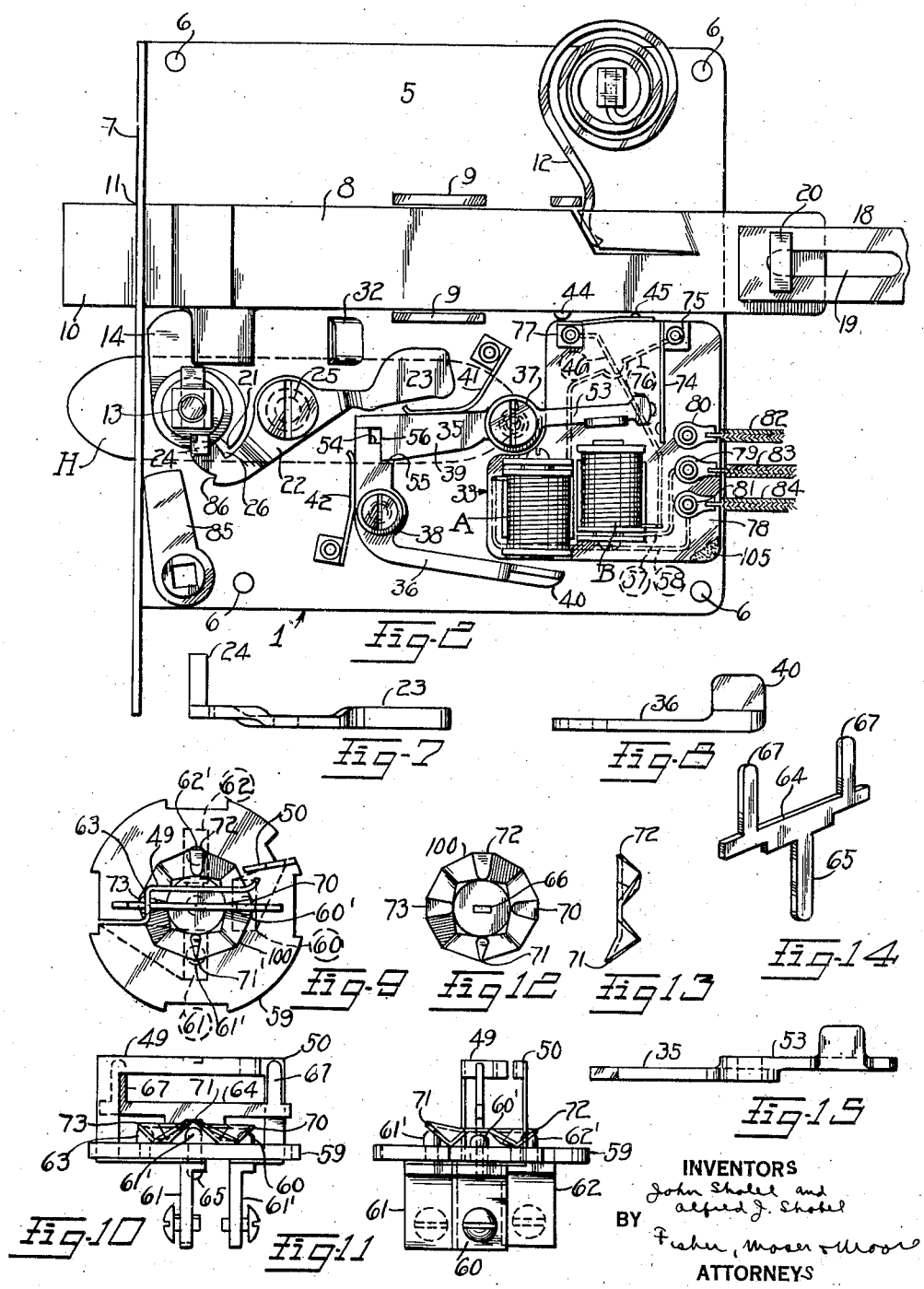

Patented June 13, 1939

2,162,567

UNITED STATES PATENT OFFICE 2,162,567

SAFETY LOCK FOR AUTOMOBILE DOORS AND THE LIKE

John Shobel and Alfred J. Shobel, Cleveland, Ohio

Application November 8, 1937, Serial No. 173,462

11 Claims. (Cl. 70—264)

Our invention relates to safety locks for automobile doors and the like.

The general object of the invention is to provide improved door locking means for maintaining the doors of an automobile locked at all times except when the operator either purposely or unintentionally leaves the ignition key in the vehicle and in which case only the door through which exit is made will remain unlocked.

A further object of the invention is the provision of novel means for locking and unlocking an automobile door or doors.

A still further object of the invention is to provide novel means for maintaining one or more doors in locked position.

Other objects and advantages of the invention will be readily understood as the description is considered in connection with the accompanying drawings, in which:

Figure 1 is a front view showing the lock in unlocked position, and the ignition switch with the electrical circuits in diagram;

Figure 2 is a view similar to Figure 1 but showing the lock in locked position, the switch and circuits being omitted;

Figure 3 is a view of the inside door handle with pull strap partly broken away;

Figure 4 is a perspective view of the outer door handle;

Figure 5 is a detail of the cam member for tripping the handle locking pawl;

Figure 6 is a partial sectional view enlarged of the combined ignition and door lock switch;

Figure 7 is a side elevation of the handle locking pawl;

Figure 8 is a side elevation of the supporting and locking armature lever;

Figure 9 is a plan view of part of the ignition switch removed from its housing;

Figure 10 is a side elevation of Figure 9;

Figure 11 is an end elevation of Figure 10;

Figure 12 is a plan view of the rotary contact member of the ignition switch;

Figure 13 is a side elevation of the rotary contact member;

Figure 14 is a perspective view of the rotating contact actuating member; and

Figure 15 is a side view of the pawl tripping armature lever.

Heretofore there has been considerable objection to certain types of locks used on automobile doors due to the fact that the operator frequently locked himself out when the automobile keys were inadvertently left in the car. Furthermore, no provision was made in many of these prior types of locks, or only inadequate provision was made to guard against unauthorized entrance to the car while the operator was in the car. According to the present invention, it is impossible for the operator to accidently lock the door handle and therefore lock himself out after he has turned off the ignition, but neglects to remove the ignition switch key, because under these conditions the closing of the door after having been opened from the inside, in the usual manner, by the operator, does not result in the door handle becoming locked. Consequently the operator can reenter the door through which he made his exit, without using the door key. Furthermore, the operator can relock the door when in the car by merely turning the ignition key to ignition position, thus making it impossible for a person to open the door by means of the outer door handle.

Referring now more particularly to the drawings 1 denotes a mechanically and electrically operated lock for the doors of automobiles and other vehicles, only the right front door 2 and the lack therefor being shown. However it will be understood that the same lock is adapted for use on both front doors and both rear doors, according to the number of doors with which the vehicle is provided. Hinges 3 for connecting the door 2 to the door frame 4 are shown in dotted lines in Figure 1. The mechanical elements of the lock 1 are mounted in a conventional box or housing, only one panel 5 of which is shown. This panel is secured on the inside of the door, bolt holes 6 being provided for this purpose and the forward edge 7 of the panel being substantially flush with the free side edges of the door.

A latch bolt 8 is slidably mounted in guides 9 on the inside of the panel 5. When the bolt is projected through an opening 11 in the edge 7 of the housing, it will engage the customary keeper in the door jamb, not shown. The latch bolt has the customary beveled end or nose 10 for automatically latching the door, and is normally spring pressed outwardly by a suitable spring 12, into latching position. The bolt is manually movable to latched and unlatched positions by means of an outer door handle H, the round shank of which is rotatably mounted in housing 5. Fixed to the squared end 13 of the shank is a dog 14 having a shoulder 15 engaging a lug 16, on the latch bolt, for moving the bolt from projected or latched position to withdrawn or unlatched position, when the handle H and dog 14 are turned in a clockwise direction to open the door. The same operation is accomplished from within the vehicle at a point usually underneath the door window, by means of an inner door handle H' connected to one end of a link or arm 18, the other end of which is connected to the inner end of latch bolt 8, the bolt being free to be moved by handle H independently of the arm 18, by virtue of the slot and headed bolt connecting parts 19 and 20 respectively. The latch bolt actuating dog 14 is formed with a second shoulder 21 for a purpose presently described.

A handle locking pawl 22, weighted at one end as at 23 and provided with a lug 24 at the other end is pivoted to casing panel 5 as at 25. The shoulder 21 on dog 14 is normally engaged by or interlocked with a shoulder 26 on pawl 22 for locking the outside handle H against turning movement. The handle H contains a conventional rotary barrel or tumbler cylinder lock 27. To gain access to the car the owner inserts the key 28 in the barrel or cylinder lock 27 and turns the key and cylinder in a clockwise direction. A shaft 29 having a cam shaped end 30, rotates with the key and cylinder and engages a plunger 31 slidably mounted in the handle, and forces the same downwardly into contact with the lug 24 on pawl 22 and rocks the latter in an anti-clockwise direction, thus freeing the shoulder 26 on pawl 22 from the shoulder 21 on dog 14. The handle H is now free to be turned clockwise for the purpose of moving the latch bolt to unlatched position, the extent of this movement being limited by a stop 32 in the path of travel of lug 16.

Having first unlocked the handle with the key 28 and then unlatched the bolt by turning the handle H the operator can open the door and enter the car. However before entering the car the key 28 must be rotated anti-clockwise to its original position before it can be withdrawn. This movement of the key lifts the plunger 31 to its normal raised position thus permitting the pawl 22 to move clockwise by gravity back into locking engagement with the dog 14, it being understood that upon the release of the door handle H the spring 12 will have returned the latch bolt and the dog 14 to their original or Figure 1 position, in which position the handle H remains locked until the key 28 is again inserted in the lock and turned in a clockwise direction. It should be noted here that the closing of the door and incidental reciprocation of the latch bolt has no effect upon the handle locking pawl 22, except when automatic tripping mechanism 33, controlled from an ignition switch 34, is electrically brought into play. By virtue of this automatic tripping mechanism it is impossible for the operator in leaving the car to lock himself out if he should turn off the ignition but forget to remove the key 28' from the switch before or after opening the door from the inside, by means of inner handle H', as will be hereinafter described. It also permits the operator to lock the door by merely switching the ignition on.

The tripping mechanism comprises a pawl tripping lever 35 and a pawl supporting and locking lever 36, pivotally mounted on panel 5, by means of pivots or studs 37 and 38 respectively, for actuation by induction coils A and B respectively. One end 39 of unlocking or tripping lever 35 is weighted so that this end normally tends to drop by gravity and rock the lever in a counter-clockwise direction. Likewise one end 40 of lever 36 being weighted, or heavier than the other end thereof has a tendency to move downwardly by gravity and causes the lever 36 to rotate in a clockwise direction. Springs 41 and 42 cooperate with the weighted arms or ends of the respective levers 35 and 36 to increase their tendency to rotate in an anti-clockwise and a clockwise direction respectively. Spring 42 also performs an additional important function which will be described hereinafter.

Assuming the operator after parking and turning off the ignition, makes his exit, through door 2 but has neglected to remove the ignition key 28', the opening of the door results in the pawls 22 being moved to Figure 1 or inoperative position where it remains, during subsequent opening and closing movements. Thus the bolt 8 is provided with a grounded tungsten contact point 44 adapted to engage a spring contact arm 45, in the electric circuit for switch 34, when the bolt is moved to unlatched position. A line 46 leads from contact pint 45 to one side of coil B and a line 47 from the switch 34 connects through a line 57 to the other side of coil B, however the circuit to coil B is not completed except when the spring contact arm 49 of the switch is forced into engagement with the fixed arm 50, by the key 28', whereupon current from the battery 51 will flow through line 52, to fixed arm 50 and thence through resilient arm 49 to lead 47. The lighter end 53 of lever 35 will then be electrically drawn into contact with coil B thus causing the locking pawl 22 to be kicked or rotated out of engagement with the dog 14. The lighter end 36' of locking lever 36 is formed with upper and lower notches 54 and 55 in which a shoulder 56 on the weighted end of lever 35 seats during the unlocking and locked positions respectively of the outside door handle H. As the shoulder 56 rides out of notch 55 it will automatically seat in notch 54 where it will be held until lever 36 is moved in an anti-clockwise direction. Consequently the door 2 through which the operator made his exit will remain unlocked because the closing of the door will have no effect on the locking lever 35 or pawl 22.

When the operator returns to the car and turns the key previously left in the switch to "on" or ignition position, during the ordinary operations incident to starting the car, the door 2 (handle H) will become locked automatically. However, should he wish to lock the door without moving the car, it will be merely necessary to turn the key first to "on" and then back to "off" position.

It will be understood that the key 28 is primarily an unlocking key only and that the operator need not and cannot lock the outside door handle H in the usual way, with this key at any time or under any circumstances. In removing the key from the switch the door remains locked. He can only lock the handle and thus lock the door against being opened from the outside by turning on the ignition switch 34, by means of the key 28', the latter being adapted for this purpose as well as for unlocking the handle. When the key 28 is used to unlock the door from the outside it must be turned back to original position before it can be withdrawn from the cylinder lock. This action returns plunger 31 to its original or Figure 4 position and in that sense only is the key used to lock the outer door handle. In other words the keys 28 and 28' are identical. The switch 34 preferably mounted in the instrument board, is conventional insofar as the ignition system is concerned, but additional contacts and terminals are added for proper actuation of the automatic tripping mechanism 33, when the ignition is "off".

The switch 34 comprises a fiber disk 59 to which the resilient and fixed contact arms 49 and 50 are respectively connected. These arms pass through notches in the periphery of the disk and are suitably bent for attachment respectively to or for electrical contact with their respective terminal posts 60 and 61, on the rear face of the disk. There is also a third post 62, on this side of the disk, which is connected to one side of coil A by lines 48 and 58. Three round spaced electrical contacts 60', 61' and 62' respectively integrally formed on the posts 60, 61 and 62 project forwardly through the fiber disk 59 for make and break contact with a rotating substantially disk shaped contact member 100, the sole function of the latter being to make and break the electrical connection between contacts 61' and 62' in the ignition circuit, when the member 100 is turned through the medium of a bifurcated member 64 to on or ignition position. There is also a fourth dead contact 63 opposed to contact 60', which serves as a latching guide to steady or hold the contact member 100 in on and off positions. Contacts 61' and 62' are equal in heighth and somewhat higher than contacts 60' and 63'. This member 64 is formed with a rearwardly projecting rectangular stem portion 65 which extends snugly through an opening 66 of corresponding size and shape, formed in the member 100 and thence loosely into a centrally disposed guide opening in the fixed fiber disk 59. The forwardly extending bifurcations 67 of member 64 seat in spring sockets 68 projecting rearwardly from a rotating fiber disk 69, in turn formed with a narrow key slot 101 through which the key 28' extends. When the latter is turned from "on" to "off" position the disk 69 and rotating contact member 100 will be correspondingly turned. In this connection it will be noted that the periphery of the member 100 is crimped or bent to provide four spaced substantially V-shaped cam pockets or recesses 70, 71, 72 and 73 which will appropriately receive or register with the contacts 60', 61', 62' and 63 when the switch key 28' is turned to and from "on" and "off" ignition positions, such movements being possible due to the cam action of the contact member 100 in riding over the contacts and resiliently forcing the bifurcated member 64 outwardly against the tension of coil springs 102, in spring sockets 68. Pocket 71 is much deeper than the other pockets and consequently will never actually touch a contact member.

When the key 28' is in "off" position the cam pockets 70, 71, 72 and 73 respectively will register with contacts 60', 61', 62' and 63 but the circuit to coil A will not be completed because the walls of pocket 71 are out of electrical contact with contact 61'. However due to the key being in the switch, current will flow to coil B in the manner previously described, when the bolt 8 is moved to unlatched position and the circuit is closed by contact 44 on the bolt engaging with contact 45, as previously explained, and lever 35 will be drawn to pawl unlocking position by coil B. In this position arm 53 of lever 35 contacts with a spring contact arm 74 attached to a terminal post 75, which is in turn connected to one side of coil A by a line 76. The post 75 as well as a terminal post 77 on which the spring contact arm 45 is mounted are carried by an insulated fiber plate 78, on housing panel 5, which panel also supports the coils A and B. A terminal post 79 for line 57, previously mentioned, as leading to coil B, and posts 80 and 81, serving as supports for flexible leads 82, 83 and 84 leading to the hinged edge of door 2, are likewise mounted on fiber panel 78. Post 80 is connected by a wire 107 to the housing 5 which is connected to the metal door and the door 2 is grounded through the hinges 3 to body frame 4 whereby the terminal 80 is grounded. These leads 82, 83 and 84 make constant electrical contact with spring contact members 82', 83' and 84' in the frame 4, when the door 2 is closed. A second fiber plate 105 is arranged beneath the fiber plate 78, previously described and the wires or leads 46 and 57 and 76 and 58 to coils B and A respectively are positioned between these fiber plates.

In the "off" position of the ignition switch, the live contact points 61' and 62' are not bridged. The pockets 71 and 72 are in register with contacts 61' and 62' and the pockets 70 and 73 in register with low contacts 61' and 63 respectively, but pocket 71 because of its depth does not complete the circuit between contacts 61' and 62'. However when the switch is turned to "on" or ignition position the shallow pockets 70 and 73 will be brought into register and also electrical contact with high contacts 61' and 62' thus completing the circuit to coil A. In this position the flow of current is from the positive side of battery 51, through line 52 to post 61, across the post 62 and thence through line 48 to flexible connector 84 and post 81 and finally to coil A through line 58. Coil A is thus energized and the end 40 of lever arm 36 is drawn into contact with the coil. As lever 36, which is supporting pawl 22 through lever 35, moves in an anti-clockwise direction, notch 54 is moved out of engagement with the shoulder 56 on lever 35, the latter drops into notch 55 and the pawl 22 swings clockwise by gravity bringing its shoulder 26 into locking engagement with the shoulder 21 on handle locking dog 14, whereupon the handle H becomes locked. Movement of key 28' back to "off" position does not disturb the position of locking levers and consequently the door can only be opened by manipulation of the latch bolt, by means of handle H', from the inside of the car. It might also be noted here that a line 106 runs from post 62 to the ignition coil, not shown. Spring 42 holds the levers 35 and 36 resiliently in locking engagement with each other and effectually prevents them from jarring loose under vibrational stresses or jolts.

It will be understood that a cylinder lock is necessary only in one door, preferably the right hand door 2, which is most used as a point of entrance by the operator, all others will have the same mechanism preferably with that exception. Each door lock functions independently of the others and of course the mechanism described and the electrical connections to and from the battery 51, coils A and B and switch 34 will be duplicated for each door.

From the foregoing it will be understood that the automobile will always be locked when parked thereby reducing the theft hazard to a minimum; that the doors are always locked while the car is in motion and will remain locked even after the ignition switch has been turned to "off" position; that the doors may be purposely left unlocked by leaving the ignition key in the switch; that no mechanical effort on the part of the operator is required to lock the doors as the pawl 22 always locks the dog 14 except when momentarily disengaged by the action of coil B and that the door cylinder lock is only used to unlock the one door 2. Also that when the key is left in the ignition switch all doors will remain locked with the exception of that door through which the operator makes his exit.

The mechanical parts of the lock, without the electrically actuated parts, function to keep the door handle locked at all times and therefore if preferred, could be used in the rear doors of 4 door cars. On the other hand the electrical mechanism is actuated only at such times as the ignition key is left in the ignition switch and consequently is brought in play only as a safety measure, that is, when the car owner fails to adhere to normal procedure.

Due to the fact that circuit to coil A is broken at 74 when this coil actuates lever 36 and the latter in turn releases the lever 35 to drop one notch, which movement of lever 35 by gravity is aided by the action of spring 41, and due to the fact that circuit to coil B is broken when contact points 44 and 45 are separated, it will be seen that these coils are only momentarily energized, and that in consequence little current is used.

Having thus described our invention, what we claim is:

1. A door lock having a retractible lock bolt and an outside and an inside operating handle, a lock pawl electrically actuated normally movable to operative position to hold said outside handle against lock releasing movements, said pawl adapted to be operated by key controlled means operative manually from the outer side of the lock to mechanically render said pawl inoperative, or by said electrically actuated means, a key actuated electric switch, and means operative through said switch from the inner side of said lock when said key is inserted in said switch and said retractible lock bolt is actuated, for electrically moving said pawl to inoperative position.

2. A door lock having a retractible lock bolt and an outside and an inside operating handle, movable means normally operative for locking said outside handle against lock releasing movement, said movable means normally operated by a key controlled means operative manually from the outer side of the lock to mechanically move said movable means from operative to inoperative position, a key actuated electric switch, and a means controlling the movable means and operative through said switch from the inside of said lock when said key is inserted in said switch and said retractible bolt is actuated, for electrically moving said movable means from operative to inoperative position.

3. A door lock having a retractible lock bolt associated with an ignition switch and having an outside and an inside operating handle, pivotally mounted means normally operative for locking said outside handle against lock releasing movement, said pivotally mounted means adapted to be operated by key controlled means operative manually from the outer side of the lock to mechanically move said movable means from operative to inoperative position, a key actuated electric switch, and means operative through said switch from the inside of said lock when said key is inserted in the ignition switch and said retractible bolt is actuated, for electrically moving said pivotally mounted means from operative to inoperative position.

4. A door lock having a retractible lock bolt and an outside and an inside operating handle, a gravity actuated lock pawl normally set to hold said outside handle against lock releasing movements, said pawl adapted to be operated by key controlled means operative manually from the outer side of the lock to mechanically move and hold said pawl inoperative, or by an electrically actuated means, a key actuated electric switch, and electrically actuated means operative through said switch from the inner side of said lock when said key is inserted in said switch and said retractible lock bolt is actuated, for electrically moving said pawl to and for holding the same in inoperative position.

5. A door lock having a retractible lock bolt and an outside and inside operating handle, a lock pawl normally movable to operative position to hold said outside handle against lock releasing movement, said pawl adapted to be operated by key controlled means operated manually from the outside to mechanically render said pawl inoperative and an electrically operated means adapted to render said pawl inoperative when the ignition key is in the switch and the locking bolt is thrown to open the door from the inside.

6. A door lock having a retractible lock bolt and an outside and inside operating handle, an electrically actuated lock pawl normally movable to operative position to hold said outside handle against lock releasing movement, said pawl adapted to be operated by key controlled means operated manually from the outside to mechanically render said pawl inoperative or by an electrically actuated means, a key rotated switch controlling said electrically actuated pawl moving means when the key is inserted in the switch, whereby the door can not be locked when the key is in the switch.

7. A door lock associated with an ignition switch and having a retractible lock bolt and an inside and outside operating handle, a pawl normally movable to operative position to hold said outside handle against lock releasing movement, an electrically operated means for releasing the pawl, and a key operated switch closed by the insertion of the key in the ignition switch and said electrically operated means set in operation by the bolt upon its movement by the inside handle, said pawl adapted to be operated from the outside by key operative means in the outside handle.

8. A door lock associated with an ignition switch and having a retractible lock bolt and an inside and outside operating handle, a pawl normally held to lock the outside handle against lock releasing movement, and an electrically operated means for releasing the pawl, a circuit controlling said electrically operated means and having two normally open switches one closed by the insertion of a key in the ignition switch and the other closed by the lock bolt whereby the opening of the door when the key is in the switch operates the pawl and locks it in inoperative position to allow the door to be operated from the outside without the key.

9. A door lock associated with an ignition switch and having a retractible lock bolt and an inside and outside operating handle, a pawl normally held to lock the outside handle against lock releasing movement, and an electrically operated means for releasing the pawl, a circuit controlling said electrically operated means and having two normally open switches one closed by the insertion of a key and the other closed by the lock bolt and a second electrically operated means controlled by the insertion of a key in the ignition switch for releasing the first electrically operated means to allow the pawl to resume its locking position, whereby the door is locked from the inside and the opening of the door when the key is in the switch operates the pawl and locks it in inoperative position to allow the door to be operated from the outside by a key operating means in the outside handle.

10. A door lock associated with an ignition switch and having a retractible lock bolt and an inside and outside operating handle, means normally movable to operative position to hold said outside handle against lock releasing movement, an electrically operated means for releasing the handle holding means and a switch controlling said electrically operated means and controlled by the insertion of the key in the ignition switch and said outside handle holding means adapted to be operated from the outside by key operative means in the outside handle.

11. A door lock associated with an ignition switch and having a retractible lock bolt and an outside operating handle, means normally movable to operative position to hold the outside handle against lock releasing movement, an electrically operated means for releasing the handle holding means comprising a switch closed by the insertion of a key in the ignition switch and a pair of contacts closed by the retraction of the bolt whereby the outside handle can not be locked when the key is in the ignition switch, said outside handle holding means adapted to be operated from the outside by key operative means in the outside handle.

JOHN SHOBEL.
ALFRED J. SHOBEL.